(12) United States Patent
Hahn et al.

(10) Patent No.: US 6,283,543 B1
(45) Date of Patent: Sep. 4, 2001

(54) MOTOR VEHICLE ROOF

(75) Inventors: Ferdinand Hahn, Diesson; Thomas Ganz, Stockdorf; Thomas Kraus, Gauting; Horst Schulz, Herrsching, all of (DE)

(73) Assignee: Webasto Karosseriesysteme GmbH, Stockdorf (DE)

( * ) Notice: Subject to any disclaimer, the term of this patent is extended or adjusted under 35 U.S.C. 154(b) by 0 days.

(21) Appl. No.: 09/361,315

(22) Filed: Jul. 27, 1999

(30) Foreign Application Priority Data

Aug. 1, 1998 (DE) .............................................. 198 34 852

(51) Int. Cl.$^7$ ....................................................... B60J 7/00
(52) U.S. Cl. ........................... 296/223; 180/282; 180/286; 49/31; 318/277
(58) Field of Search ............................. 296/223; 180/282, 180/286; 49/31; 318/268, 271, 277

(56) References Cited

U.S. PATENT DOCUMENTS

| | | | |
|---|---|---|---|
| 4,673,852 | * | 6/1987 | Geiger .................................... 318/341 |
| 4,775,823 | * | 10/1988 | Yoshida et al. ........................ 318/277 |
| 5,167,296 | | 12/1992 | Schreier et al. ...................... 296/223 |

FOREIGN PATENT DOCUMENTS

| | | | |
|---|---|---|---|
| 2550991 | * | 5/1977 | (DE) ..................................... 296/223 |
| 3736400 | * | 5/1989 | (DE) ..................................... 296/223 |
| 40 31 552 | | 3/1992 | (DE) . |
| 62-279122 | * | 12/1987 | (JP) ...................................... 296/223 |

* cited by examiner

Primary Examiner—Dennis H. Pedder
(74) Attorney, Agent, or Firm—Nixon Peabody LLP; David S. Safran

(57) ABSTRACT

An improved motor vehicle roof is provided which includes a roof opening provided in a fixed roof surface, at least one closing element for selectively at least partially closing the roof opening, an electrical adjusting drive for driving the closing element and a sensor engineering system for detecting a situation which adversely affects the safety of the passengers and for producing a corresponding danger signal. Importantly, the roof includes a quick-action closing device coupled to the sensor engineering system which causes the closing element to close from its open or partially open position when a danger signal is present. The closing device includes means for producing an electrical voltage which exceeds the normal feed voltage (rated voltage) of the adjusting drive by several times, and for applying the voltage to the electric adjusting drive.

19 Claims, 2 Drawing Sheets

MOTOR VEHICLE ROOF

BACKGROUND OF THE INVENTION

1. Field of the Invention

The invention relates to a motor vehicle roof with a roof opening which is located in a fixed roof surface, at least one closing element for selectively at least partially closing the roof opening, an electrical adjusting drive for driving the closing element, sensor engineering for detecting a situation which adversely affects the safety of the passengers and for producing a corresponding danger signal, and a quick-action closing device which is coupled to the sensor engineering and which causes the closing element to close quickly from its open or partially open position when a danger signal is present. Furthermore, this invention relates to a process for at least partially closing a roof opening provided in a fixed roof surface of a motor vehicle by means of an electrically drivable closing element.

2. Description of the Related Art

A motor vehicle roof of the type described hereinabove is disclosed in German Patent 40 31 552 C2. The quick-acting closing device is made independently of the adjusting drive. As the power source for closing the closing element, the quick-acting closing device has an energy storage which can be a mechanical energy storage, hydraulic or pneumatic energy storage or a chemical energy storage, for example, in the form of a propellant. The motor vehicle roof disclosed in German Patent 40 31 552 C2, especially in the embodiment including a tensionable spring arrangement acting as the energy storage, is disadvantageous in that its structure is rather complex and requires a host of parts. Since, furthermore, the tension springs oppose any opening motion of the closing element, an unduly large force must be applied to open the closing element. When the closing element is to be electrically driven, there must be a drive motor which is much stronger than a conventional roof drive motor or gear multiplication becomes necessary.

SUMMARY OF THE INVENTION

Therefore the object of this invention is to provide a motor vehicle roof and a process for at least partially closing a motor vehicle roof opening, in which, in a danger situation, a quick closing process can be initiated without the need for undue structural changes on the roof itself or on the adjusting drive.

This and other objects are achieved by providing the motor vehicle roof of the present invention including a closing device having means for producing an electrical voltage and for applying the voltage to the electric adjusting drive wherein a voltage which exceeds the normal feed voltage (rated voltage) of the adjusting drive by several times. In this way, in any electrical actuated motor vehicle roofs, emergency closing can be easily effected without the need for complex components, for example, such as the energy storage disclosed in German Patent 40 31 552 C2. With the approach of the present invention, existing systems can be retrofitted without modifying the roof mechanism. By applying an electrical voltage to the closing element which exceeds the normal feed voltage (rated voltage) of the adjusting drive by several times, the closing element can be closed so quickly in the event of an accident that both the ejection of passengers through the roof opening and also the penetration of foreign bodies through it are effectively prevented.

In particular, the means for producing an electrical voltage can comprise a step-up DC/DC transformer which is connected to a motor vehicle battery. By means of this direct current-direct current transformer, in the event of danger, the voltage delivered from the motor vehicle battery can be transformed into a voltage which is a multiple of the normal feed voltage, i.e. the rated voltage of the electrical adjusting drive which is generally made as a direct current motor. A preferred voltage range for a fast process of the closing element in the event of danger extends from 100 to 120 V.

To preclude from the start excess losses when the high voltage is applied to the electrical adjusting drive via the motor vehicle wiring harness, especially via a cable with a small cable cross section, a line which is independent of the motor vehicle electrical system may be provided. This line connects one output of the step-up DC/DC transformer to one input of the adjusting drive.

Another possibility for providing high voltage for prompt closing of the closing element in the event of danger consists in that the means for generating an electrical voltage comprise a voltage source which is independent of the motor vehicle battery and which generates an electrical voltage which exceeds the normal feed voltage of the electrical adjusting drive by several times.

In another embodiment of the present invention, quick closing of the closing element, aside from actual crash acquisition, can be influenced by several additional parameters. For this purpose, for example, a seat occupancy detection means, a belt lock detection means and/or pinch protection can be provided. These additional means each interact with the closing means in order to stop or entirely prevent the closing motion of the closing element depending on the output signals of these means, for example, when one or more of these means detect, in the case of an accident, a passenger sitting in the area of the roof opening has been raised from the seating surface, and that there is the danger that this passenger could be injured by the closing element which is rapidly closing. Furthermore, stopping of the closing motion in an intermediate position, for example roughly 200 mm in front of the completely closed position, can also be provided to prevent pinching of body parts.

The closing element of the present invention, which can be quickly closed when a situation which adversely affects the safety of the passengers is detected, can be made, for example, as a movable head liner or as a roof cover.

To further the protection for the passengers in the case of an accident, there can furthermore be an airbag which in case of danger covers the roof opening for the instant of quick closing.

The aforementioned object is furthermore achieved by a process for at least partially closing a roof opening provided in a fixed roof surface of a motor vehicle by means of an electrically drivable closing element. The process includes detecting a situation which adversely affects the safety of the passengers using sensor engineering provided on the vehicle. The process further includes generating an electrical voltage and applying the voltage to the electrically drivable closing element, wherein the voltage exceeds the normal feed voltage (rated voltage) of the electrical adjusting drive for driving the closing element by several times.

DETAILED DESCRIPTION OF THE INVENTION

Figure 1:
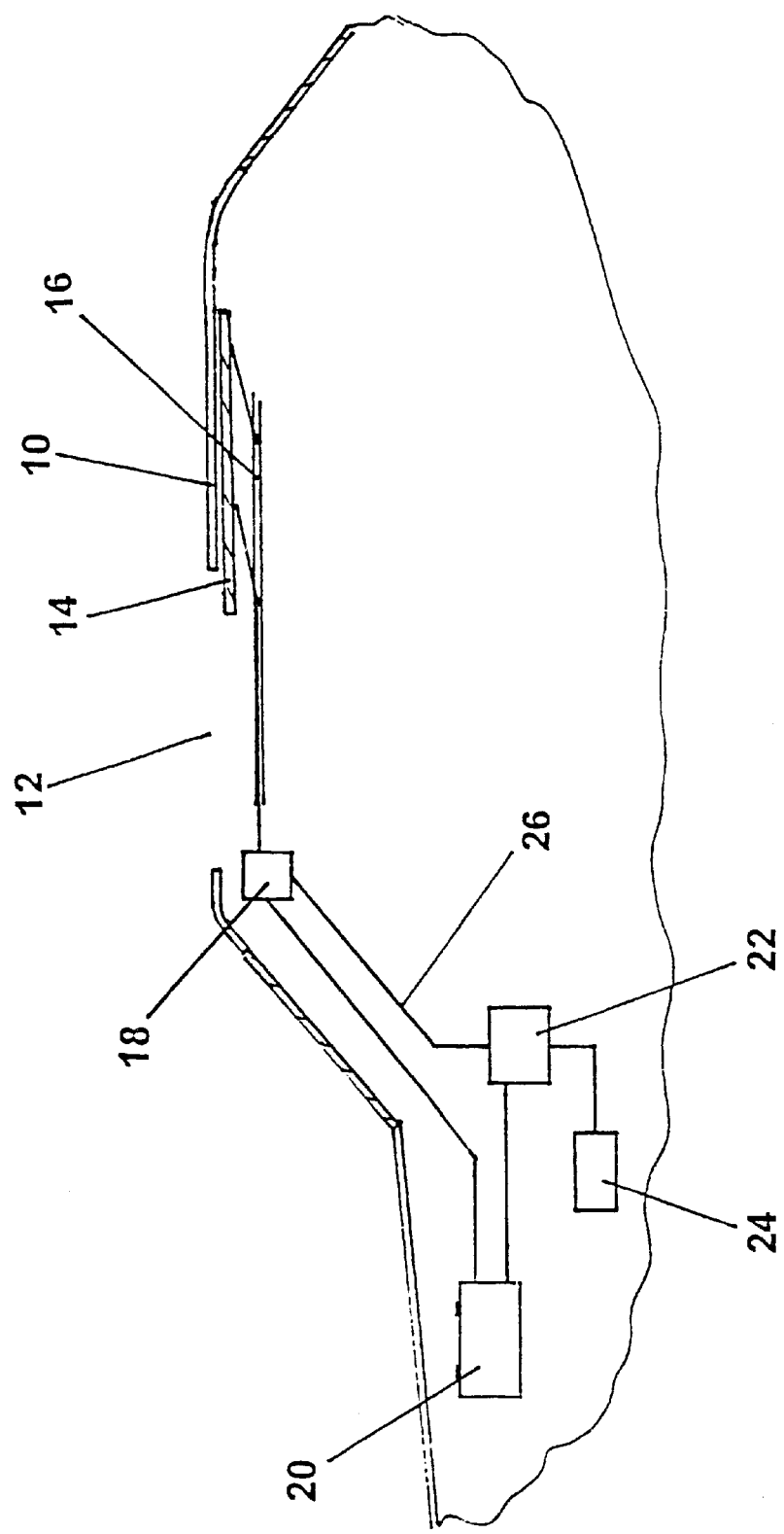
FIG. 1 shows a partial schematic section through a motor vehicle equipped with the motor vehicle roof of the present invention.

In the motor vehicle shown schematically in FIG. 1, a roof opening 12 is provided in a fixed roof surface 10. The roof opening 12 can be closed by means of a closing element 14. In the embodiment shown in FIG. 1, closing element 14 is the cover of a sliding roof which can be moved back and forth along a guide 16 mounted on the roof. This principle, however, can also be applied similarly to any other types of electrically drivable motor vehicle roofs, such as, for example, spoiler roofs, sliding and lifting roofs, louvered roofs and other similar roofs.

To adjust the closing element 14, an electrical adjusting drive 18 is provided which is supplied by battery 20 of the motor vehicle. In FIG. 1, a quick-acting closing device and sensor engineering coupled to the closing device are shown schematically as blocks 22 and 24, respectively. Closing device 22 is supplied by vehicle battery 20 and is connected to adjusting drive 18 via a line 26.

As will be detailed below, sensor engineering 24 is used to detect or sense a situation which adversely affects the safety of the passengers and to produce a corresponding danger signal. For this purpose, sensor engineering 24 may include, for example, a conventional crash sensor, a wheel sensor or other similar sensor which reacts to excess accelerations. In case of danger, sensor engineering 24 delivers a signal to closing device 22 which causes a closing motion of closing element 14.

Figure 2:
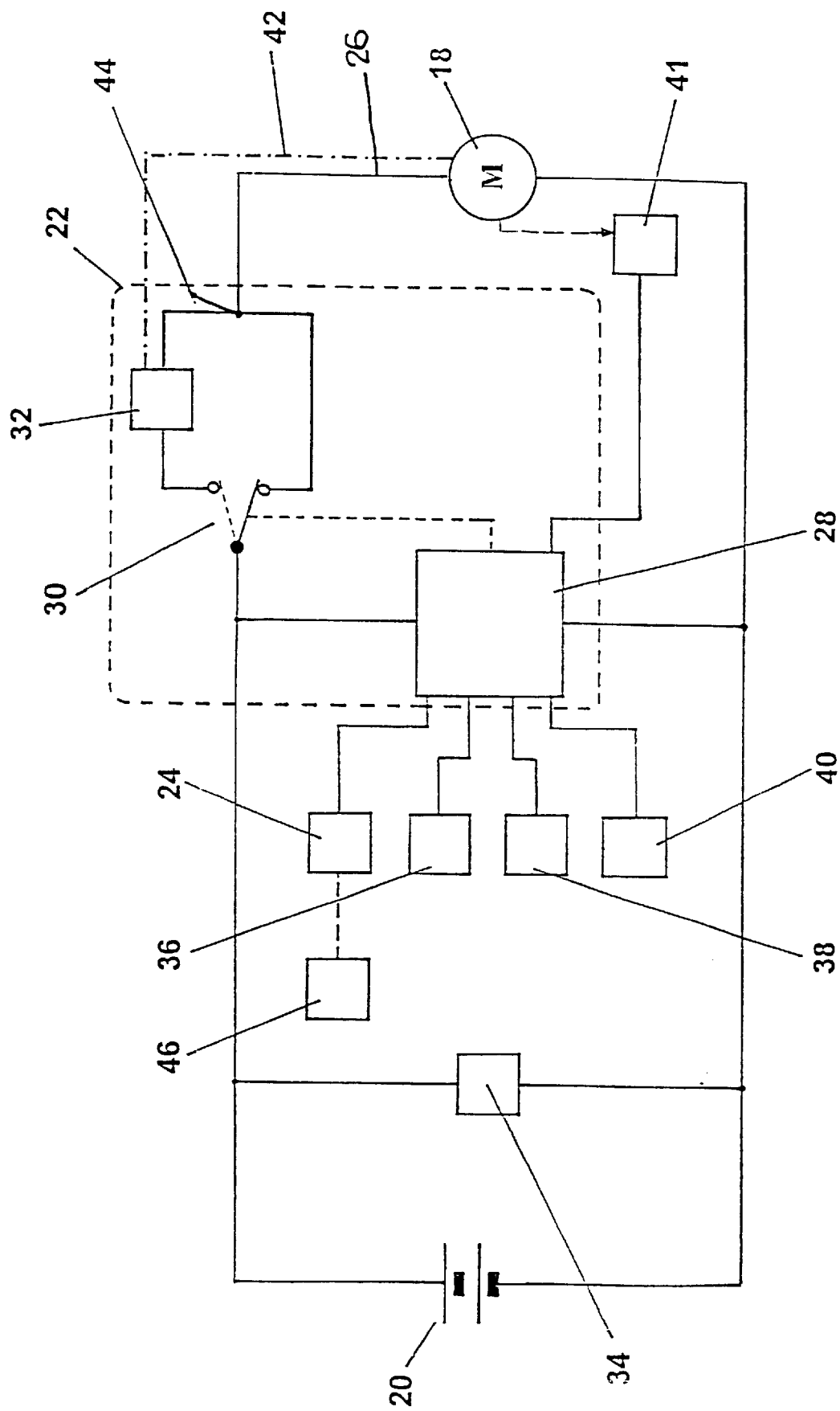
FIG. 2 shows a schematic wiring plan for the motor vehicle roof of FIG. 1.

With reference to FIG. 2, a possible wiring of the motor vehicle roof of FIG. 1 is detailed. Electrical adjusting drive 18 for driving closing element 14 (FIG. 1) is connected via an actuating switch (not shown) to the vehicle battery 20 which ordinarily delivers a voltage of roughly 12 V. Closing device 22 is indicated in FIG. 2 in the form of a broken-line block and includes a control circuit 28, a changeover switch 30 which can be activated by the control circuit 28, and a step-up DC/DC transformer 32. If sensor engineering 24, which as explained above can have a crash sensor, detects a situation which adversely affects the safety of the passengers in which roof opening 12 (see FIG. 1), which is at least partially opened before this situation occurs, is to be closed by means of closing element 14, sensor engineering 24 delivers a corresponding danger signal to control circuit 28 which activates changeover switch 30. When changeover switch 30 is activated, it switches from the normal position (FIG. 2), in which electrical adjusting drive 18 is connected to vehicle battery 20, into the danger position shown in broken lines in which step-up DC/DC transformer 32 is connected between vehicle battery 20 and electrical adjusting drive 18. As a result, the voltage which has been delivered by vehicle battery 20 is transformed into a multiple of the rated voltage of electrical adjusting drive 18 in order to close closing element 14 much more quickly than in normal operation. Other electrically operated components in the motor vehicle, as are indicated in FIG. 2 by the block 34, are not adversely affected by the high voltage generated by transformer 32.

FIG. 2 furthermore shows other detection means coupled to control circuit 28 in schematic form which may include, for example, a seat occupancy detection means 36, a belt lock detection means 38, pinching protection 40 or other means which monitor parameters which can be important for the operation of the quick-closing means. One example of another monitoring means is a position sensor 41 which monitors whether the closing element is in its closed position anyway or in a position which is rather near the closing position so that operation of the quick-closing means of the present invention is superfluous.

As already indicated, closing element 14, which can be quickly closed in case of danger, may be, for example, a roof cover or a head liner which can move underneath the roof opening.

Since the entire closing device 22 is independent of the execution of the electrically drivable closing element, the present invention is suited for retrofitting existing systems. In particular, in this retrofitting, no changes on the roof superstructure are necessary. If desired however, there can be a line independent of the motor vehicle electrical system which preferably has a larger cable cross section to preclude, from the start, losses in the use of the "normal" motor vehicle wiring harness for transmission of relatively high voltage to the closing element. One such independent line is indicated at 42 in FIG. 2 in dot-dash lines. This line 42 would then replace the section 26 of line between transformer 32 and junction 44. Furthermore FIG. 2 schematically illustrates an airbag 46 which in case of danger closes the roof opening for the instant of quick closing. This airbag can be triggered via sensor engineering 24 which is used to trigger the quick closing process.

We claim:

1. A motor vehicle roof for a motor vehicle, comprising:
    a fixed roof surface;
    a roof opening located in the fixed roof surface;
    at least one closing element for selectively at least partially closing the roof opening;
    an electrical adjusting drive for driving the closing element;
    a sensor engineering system for detecting a situation which adversely affects the safety of passengers in the vehicle and for producing a corresponding danger signal; and
    a quick-action closing device coupled to the sensor engineering system and adapted to cause the closing element to close from one of an open and a partially open position when the danger signal is present, wherein the closing device includes a means for producing an electrical voltage exceeding a normal feed voltage of the adjusting drive by several times and for applying the voltage to the electric adjusting drive.

2. The motor vehicle roof of claim 1, wherein the means for producing an electrical voltage includes a step-up DC/DC transformer connected to a motor vehicle battery.

3. The motor vehicle roof of claim 2, further including a line connecting one output of the step-up DC/DC transformer to one input of the adjusting drive, the line being independent of a motor vehicle electrical system.

4. The motor vehicle roof of claim 1, wherein the means for generating an electrical voltage generates an electrical voltage exceeding a normal feed voltage of the electrical adjusting drive by several times.

5. The motor vehicle roof of claim 1, wherein the voltage, which is applied to the electrical adjusting drive when a danger signal is present, is between 100 and 120 V.

6. The motor vehicle roof of claim 1, further including a seat occupancy detection device which interacts with the closing device.

7. The motor vehicle roof of claim 1, further including a belt locking detection device which interacts with the closing device.

8. The motor vehicle roof of claim 1, further including a pinching protection device which interacts with the closing device.

9. The motor vehicle roof of claim 1, wherein the closing device includes an electronic circuit which at least one of stops and completely prevents the closing motion of the closing element depending on the output signals of at least one of a seat occupancy detection means, a belt lock detection means and a pinch protection device.

10. The motor vehicle roof of claim 1, wherein the closing element is a movable head liner.

11. The motor vehicle roof of claim 1, wherein the closing element is a roof cover.

12. The motor vehicle roof of claim 1, further including an air bag capable of covering the roof opening in case of danger.

13. The motor vehicle roof of claim 1, wherein the closing means stops the closing motion before reaching an end position of the closing element.

14. A process for at least partially closing a roof opening provided in a fixed roof surface of a motor vehicle using an electrically drivable closing element and an electrical adjusting drive for driving the closing element, comprising the steps of:

detecting a situation which adversely affects the safety of the passengers using a sensor engineering system provided on the vehicle;

producing an electrical voltage which exceeds a rated normal feed voltage of the electrical adjusting drive for driving the closing element by several times; and applying the electrical voltage which exceeds the rated normal feed voltage to the electrically drivable closing element.

15. The process of claim 14, wherein the voltage which exceeds the rated normal feed voltage of the electrical adjusting drive by several times is produced by a step-up DC/DC transformer connected between a vehicle battery and the electrical adjusting drive.

16. The process of claim 14, wherein the voltage which exceeds the rated normal feed voltage of the electrical adjusting drive by several times is produced by a voltage source.

17. The process of claim 14, further including the steps of monitoring the roof opening during the closing motion of the closing element for possible pinching of at least one of articles and vehicle passengers, and stopping the movement of the closing element when a threatening pinching situation is detected.

18. The process of claim 14, further including monitoring the occupancy of seats in the motor vehicle in an area of the roof opening.

19. The process of claim 14, further including the step of monitoring whether seat belts, on seats located in the area of the roof opening, are locked.

* * * * *